Sept. 15, 1925.

C. E. REEVES

PACKING GAUGE

Filed April 14, 1924

1,554,031

Witnesses
Milton Lenoir
F. O. Florell

Inventor
Claude E. Reeves,
George Heideman
Attorney

Patented Sept. 15, 1925.

1,554,031

UNITED STATES PATENT OFFICE.

CLAUDE E. REEVES, OF SAN BERNARDINO, CALIFORNIA.

PACKING GAUGE.

Application filed April 14, 1924. Serial No. 706,491.

*To all whom it may concern:*

Be it known that I, CLAUDE E. REEVES, a citizen of the United States, and a resident of San Bernardino, in the county of San Bernardino and State of California, have invented certain new and useful Improvements in Packing Gauges, of which the following is a description, reference being had to the accompanying drawing, which forms a part of my specification.

My invention relates to gauges more especially intended to measure the packing rings of steam cylinders, which are usually composed of similar segments describing arcs corresponding to the diameter of the cylinder for which the packing is intended; although the gauge may be employed for other uses where accuracy as to length and width of the segmental elements is required.

The object of my invention is to provide a gauge adapted for accurately measuring the segments of rings of various diameters; that is to say, for measuring the segments of rings intended for cylinders of any diameter; and thus eliminates the necessity of providing a gauge for each cylinder of different diameter; my improved gauge being adjustable to the different diameters of cylinders.

A further object of my invention is to provide a gauge whereby worn packing ring segments may be measured and the length of each segment, necessary to provide a complete and proper packing ring, may be accurately determined.

Another object of my invention is to provide a gauge whereby the width of each packing ring segment may also be ascertained, in order that the fitness of the respective segments of a given sized packing ring may be quickly determined and the extent of radial wear of the packing ring or of its respective segments easily discerned.

The above enumerated objects and advantages of my invention, as well as other advantages inherent in the construction, will all be more readily comprehended from the detailed description of the accompanying drawing, wherein:—

In the particular exemplification of the invention, the gauge comprises a sector shaped flat plate 10 having radial sides 11 and 12 which radiate from a common center or axis indicated at 13 disposed in the extended portion or tip 14 of the plate.

Figure 1:
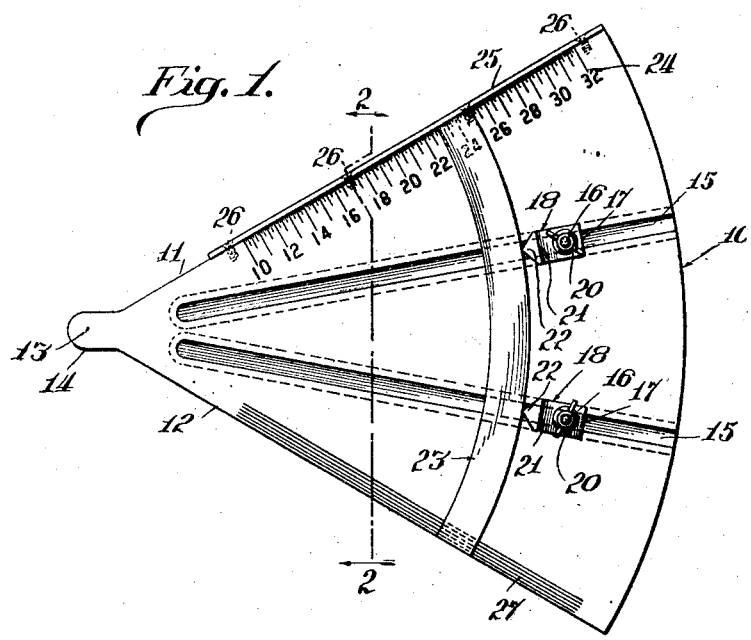
Figure 1 is a plan view of my improved gauge and a segment of packing ring thereon.
Figure 2:
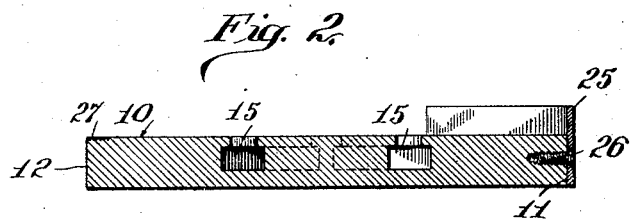
Figure 2 is a cross-sectional view, taken on the line 2—2 of Figure 1.
Figure 4:
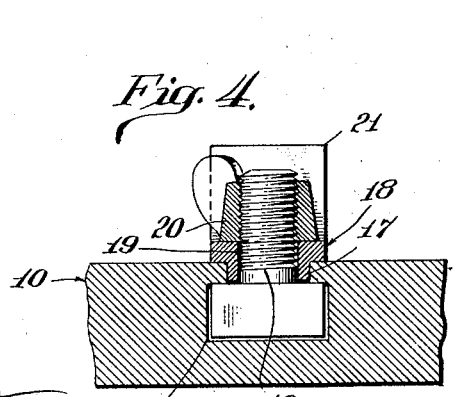
Figure 4 is a detail sectional view of the positioning member adjustable fastening means.
Figure 3:
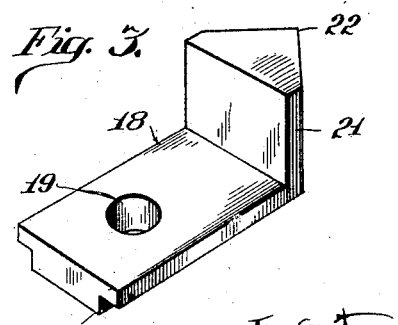
Figure 3 is a detail view, in perspective, of one of the adjustable ring segment positioning members.

The plate, which is of comparative thickness, as more clearly shown in Figure 2, is by preference provided with a pair of inverted T-shape slots 15, 15 which also are arranged along lines that radiate from the common center or axis 13 and extend from the outer arcuate surface of the plate to a point slightly removed from the center or axis 13, as shown in Figure 1. The slots are open at the arcuate side of the plate to permit the insertion of the heads of bolts 16, 16 into the slots 15; while the upper portions of the slots 15, 15 are also adapted to receive the rib or reduced base portion 17 of the positioning blocks or members 18, 18.

The base of the blocks or positioning members 18 is also provided with a suitable non-threaded opening 19 for the passage of the threaded end of the bolt 16 which latter is shown provided with a thumb or butterfly nut 20 whereby the head of the bolt 16 is firmly drawn into clamping relation with the upper walls of the slot 15 and the blocks or positioning members 18 thereby also firmly clamped in adjusted position on the face of the plate 10.

The blocks or members 18 are each provided with an upstanding portion or end 21 which is preferably tapered forwardly or made V-shape in cross section, as shown at 22, so as to provide a contacting point or stop for the outer perimeter of the packing ring segment which is shown at 23.

It is apparent that the blocks or members may be moved lengthwise of the slots by releasing the butterfly nuts and the blocks arranged at any desired distance from the common center or focusing point 13; which distance will correspond to half the internal diameter of the cylinder for which the packing ring segments are intended.

One of the radial sides, namely the side 11, is provided with graduations indicated at 24 disposed at right angles to the side.

The graduations in practice are preferably arranged on a scale of one-sixteenth of an inch apart and are intended to represent the diameters of different cylinders; as for example, cylinders having diameters from ten inches to thirty-two inches as indicated in Figure 1.

The side 11, provided with the graduations or scale just referred to, is also provided with an upstanding edge, which may be integral with the plate 10, but which preferably consists of a stop-plate 25 suitably secured to the side, as for example by means of the screws 26. The plate 25 is intended to extend into a plane above the top face of the main plate 10 in order to provide an abutment or stop for one end of the packing ring segment 23.

The opposite radial side 12 of the plate 10 is shown provided with a suitable number of graduations indicated at 27 extending lengthwise of the side and parallel therewith and therefore readable transversely of the plate 10. The graduations 27 are also preferably arranged one-sixteenth of an inch apart and are for the purpose of determining or gauging the extent to which the packing ring segment may be lacking in proper length in order to provide, in conjunction with the complemental segments, a packing ring of given diameter adapted to a given sized cylinder for which the stop blocks or members 18, 18 have previously been set.

My improved gauge is intended for measuring the segments of packing rings and more especially for measuring worn packing ring segments, in order to determine the extent to which they have become worn, both in radial width and in circumferential length.

In practice, the positioning blocks or members 18, 18 are moved lengthwise of their respective slots until the forwardly presented points 22 thereof are disposed at a distance from the common axis or focusing point 13, corresponding with one-half the internal diameter of the cylinder in which the packing ring segments are to be used; the butterfly nuts being then screwed down to firmly clamp the members 18, 18 in place. The internal diameter of the cylinder will be indicated by the graduations 24 which is in circumferential alignment with the forward tips or points 22 of the members 18, 18. The packing ring segment to be gauged or measured is then placed on the plate 10, with its outer perimeter abutting the points 22 and with one end of the segment in contact with the stop ledge or guide plate 25. If the segment when so positioned terminates flush with the other radial side 12, it is evident that the segment is suitable for a cylinder of the dimensions indicated by the graduation in circumferential alignment with the tips 22 of members 18, 18, namely the graduation registering with the outer perimeter of the segment.

The graduations 24 serve to determine the curvature of the segment and indicate that the segment is intended for a cylinder having a diameter as determined by the position of members 18; as it is apparent that a segment of any other radius would not register with the proper graduations and also come flush with the other side 12 of the plate.

The graduations 24, therefore, also serve to check the radial width of the segment and thus afford means for determining the amount of radial wear; while the graduations 27, along the other radial side of the plate, enable the user to gauge the length of the segment and to determine the extent to which the segment has become shortened and therefore definitely showing how much an inferior packing ring segment is short of the standard size.

In the particular exemplification of the invention, the gauge is shown adapted for the type of packing rings composed of six segments of equal length; with the packing ring segment 23 positioned on the gauge as indicating that it is intended for a cylinder having an internal diameter of twenty-five inches. It is apparent that my improved gauge is adapted to accurately measure the segments of packing rings of any diameter, provided the sector plate is of a degree corresponding to the degree of length of the segments of the ring, thus eliminating the necessity of having a gauge for each cylinder of different diameter.

At the same time, it is also apparent that my invention can be applied to a gauge for measuring any type of packing ring segment, provided, of course, that the plate 10 is of an angle corresponding with the number of segments in the packing rings to be gauged thereby; and while I have described my invention in terms employed merely as terms of description and not as terms of limitation, structural modifications may be made without, however, departing from the spirit of my invention.

What I claim is:—

1. A gauge of the character described, comprising a flat plate provided with graduations arranged along lines radiating from a common center so as to define an angle of a predetermined degree, with the graduations along one line arranged at right angles to said line to determine the length of the radius, while the graduations along the other line are arranged parallel with said line to determine distance from said line, and a pair of members movable on said plate along lines radiating from said common center intermediate of the first two mentioned lines, and means for securing said member to said plate in adjusted positions.

2. A gauge of the character described, comprising a flat sector plate provided with graduations along the two radial sides of the plate, with the graduations on one side arranged at right angles thereto, while the graduations on the other side are arranged parallel with said side, a stop arranged along one radial side of the plate, and means mounted on the plate intermediate of the radial sides and movable along a path radiating from the common axis of the radial sides, and means for securing said first means in adjusted positions.

3. A gauge of the character described, comprising a flat sector plate provided with an upstanding edge along one radial side of the plate and a pair of slots disposed along lines radiating from the common axis of the radial sides of the plate, upstanding blocks slidable in said slots, and means whereby the blocks may be secured at predetermined points in the slots, the plate being provided with scales or graduations readable in a radial direction and in a direction transverse to said radial direction.

4. A gauge of the character described, comprising a flat sector plate, there being graduations arranged along both radial sides of the plate, with the graduations on one radial side arranged at right angles thereto to determine the length of the radius, while the other graduations are arranged parallel with the other radial side to determine distance from said side, and means mounted on the plate intermediate of the radial sides and movable along a path radiating from the common axis of the radial sides, and means for securing the first means in adjusted positions.

5. A gauge of the character described, comprising a flat sector plate, there being graduations arranged along both radial sides of the plate, with the graduations on one radial side readable lengthwise of said side, while the graduations on the other radial side are readable transversely of the plate, the plate having a pair of slots intermediate of its radial sides, spaced apart and radiating from the common axis of the radial sides, and a pair of positioning members adjustable lengthwise of the slots.

6. A gauge of the character described, comprising a flat sector plate having graduations arranged radially and transversely, one radial side of the plate being provided with an upstanding edge, the plate being provided with a pair of T-slots disposed along lines radiating from the common axis of the radial sides of the plate, said slots being extended through to the arcuate side of the sector plate, a block slidable in each slot and provided with an upstanding end tapering forwardly, a bolt disposed through each block with the head of the bolt arranged in the T-slot, and means secured on the bolt for clamping the bolt-head and block in place.

7. A gauge of the character described, comprising a plate provided with an upstanding ledge disposed along a line radiating from a common center or focusing point and with graduations on the plate adjacent to said ledge at right angles thereto to determine the length of the radius, and means adjustably secured to the plate and movable along a path radiating from said common center or focusing point.

8. A gauge of the character described, comprising a flat sector plate, the sides of the sector plate radiating from a common axis, a pair of stop blocks adjustably secured to the sector plate, said stop blocks being provided with forwardly tapered ends, with the blocks movable along paths radiating from the common axis and intermediate of the sides of the sector plate, and means whereby the stop blocks may be locked in adjusted position.

CLAUDE E. REEVES.